(12) United States Patent
Chen et al.

(10) Patent No.: US 8,570,654 B2
(45) Date of Patent: Oct. 29, 2013

(54) FREE-SPACE OPTICAL HYBRID

(75) Inventors: Bin Chen, Shenzhen (CN); Xiaohui Ren, Shenzhen (CN); Linyong Chen, Shenzhen (CN); Hong Xie, Shenzhen (CN)

(73) Assignee: O-Net Communications (Shenzhen) Limited, Shenzhen (CN)

( * ) Notice: Subject to any disclaimer, the term of this patent is extended or adjusted under 35 U.S.C. 154(b) by 209 days.

(21) Appl. No.: 13/144,084

(22) PCT Filed: May 19, 2010

(86) PCT No.: PCT/CN2010/072936
§ 371 (c)(1),
(2), (4) Date: Jul. 12, 2011

(87) PCT Pub. No.: WO2011/127670
PCT Pub. Date: Oct. 20, 2011

(65) Prior Publication Data
US 2011/0299162 A1    Dec. 8, 2011

(30) Foreign Application Priority Data

Apr. 14, 2010 (CN) .......................... 2010 1 0151998

(51) Int. Cl.
*G02B 5/30* (2006.01)
*G02B 27/28* (2006.01)

(52) U.S. Cl.
USPC .................................. 359/489.08; 359/489.01

(58) Field of Classification Search
USPC ........................................ 359/489.09, 489.08
See application file for complete search history.

(56) References Cited

PUBLICATIONS

International Search Report of PCT/CN2010/072936.

*Primary Examiner* — Jade R Chwasz

(57) ABSTRACT

A free-space optical hybrid is provided. The free-space optical hybrid includes a polarizing beam splitter that split the light beams S and L into horizontal polarization light beams Sx, Lx and orthogonal polarization light beams Sy, Ly, respectively, at least one birefringent crystal splits the horizontal polarization light beams Sx, Lx and orthogonal polarization light beams Sy, Ly into light beams Sxo, Sxe, Lxo, Lxe, Syo, Sye, Lyo, Lye, a light combiner that combine the light beams Sxo+Lxo, Sxo−Lxo, Sxe+jLxe, Sxe−jLxe, Syo+Lyo, Syo−Lyo, Sye+jLye, Sye−jLye and output the light beams at ports. The present invention can realize an optical hybrid in free-space by using a birefringent crystal and can split light beams of different polarization statuses in free-space well. The optical hybrid offers a compact structure and good stability.

13 Claims, 3 Drawing Sheets

FREE-SPACE OPTICAL HYBRID

FIELD OF THE INVENTION

The present invention generally relates to coherent detection, and more specifically, relates to a compact, high splitting ratio and good stability optical hybrid.

BACKGROUND

Optical coherent receivers require the signal has the same polarization status as the reference light beam. However, the current optical hybrid cannot control the polarization status neatly. Therefore, an additional polarization controller is needed to ensure the polarization status.

Optical hybrid has traditionally been constructed by using two 50/50-beam splitters, two beam combiners and one 90 degree phase shifter. This optical hybrid can be implemented using all-fiber or planar waveguide technology. But the two approaches have their own disadvantages. The two approaches need precise temperature control circuits to sustain precise difference of optical path length, and thus sustain an accurate output light phase. In addition, the fiber based instruments are huge in size and are unstable to mechanical shock and vibration. The waveguide based products encounter problems from high insertion loss, high polarization dependence and manufacture capacity. The waveguide products are also not flexible for customization and require substantial capital resources to set up.

SUMMARY

It is an object of the present invention to provide a compact structure and good stability optical hybrid which split the light beam with the same polarization statue in free-space by using a birefringent crystal.

According to one aspect of the present invention, a free-space optical hybrid is provided. The free-space optical hybrid includes a polarizing beam splitter splitting the light beams S and L into horizontal polarization light beams Sx, Lx and orthogonal polarization light beams Sy, Ly respectively; at least one birefringent crystal splitting the horizontal polarization light beams Sx, Lx and orthogonal polarization light beams Sy, Ly into light beams Sxo, Sxe, Lxo, Lxe, Syo, Sye, Lyo, Lye; and a light combiner combining the light beams Sxo+Lxo, Sxo−Lxo, Sxe+jLxe, Sxe−jLxe, Syo+Lyo, Syo−Lyo, Sye+jLye, Sye−jLye and outputting the light beams at ports. Wherein the light beams Syo+Lyo, Sye+jLye, Syo−Lyo and Sye−jLye are the mixed beams of beam S and beam L at X polarization status, and the phase relations of the beam S and beam L of four beams are $pi\_0+0$, $pi\_0+pi/2$, $pi\_0+pi$, $pi\_0+pi3/2$; the beams Syo+Lyo, Sye+jLye, Syo−Lyo, Sye−jLye are the mixed beams of beam S and beam L at Y polarization status, and the phase relations of the beam S and beam L of four beams are $pi\_0+0$, $pi\_0+pi/2$, $pi\_0+pi$, $pi\_0+pi3/2$.

According to one embodiment of the present invention, the polarizing beam splitter is PBS or birefringent crystal.

According to another embodiment of the present invention, a quarter-wave plate is configured between the polarizing beam splitter and the birefringent crystal, the quarter-wave plate transforms the light beam emitted from the polarizing beam splitter into circular polarization light.

According to another embodiment of the present invention, the free-space optical hybrid further includes a plurality of phase shifters configured between the birefringent crystal and the light combiner for regulating the phase of each light. The phase shifters are glass plates or silicon plates.

According to another embodiment of the present invention, at least one birefringent crystal includes a first birefringent crystal for receiving the light beams Sx and Lx splitted by the beam splitter, and splitting the light beams Sx and Lx into the light beams Sxo, Sxe, Lxo and Lxe.

According to another embodiment of the present invention, at least one birefringent crystal includes a second birefringent crystal for receiving the light beams Sy and Ly splitted by the light-splitter, and splitting the light beams Sx and Lx into the light beams Syo, Sye, Lyo and Lye.

According to another embodiment of the present invention, a first light combiner is provided at the right side of birefringent crystal, the first light combiner combines the light beams Sxo, Sxe, Lxo and Lxe which transmit through the birefringent crystal into light beams Sxo+Lxo, Sxo−Lxo, Sxe+jLxe, Sxe−jLxe.

According to another embodiment of the present invention, a second light combiner is provided at the right side of birefringent crystal, the second light combiner combines the light beams Syo, Sye, Lyo and Lye which transmit through the birefringent crystal into light beams Syo+Lyo, Syo−Lyo, Sye+jLye, Sye−jLye.

According to another embodiment of the present invention, the light beams Sxo+Lxo, Sxe+jLxe, Sxo−Lxo, Sxe−jLxe, Syo+Lyo, Sye+jLye, Syo−Lyo, Sye−jLye converge on a corresponding photo detector via reflectors or lenses.

According to another embodiment of the present invention, the birefringent crystal is a rutile, sapphire, yttrium orthovanadate (YVO4) crystal, MgF2 crystal, a-BaB2O4 crystal, lithium niobate or quartz crystal.

The present invention can realize an optical hybrid in free-space by using a birefringent crystal and can split light beams of different polarization statuses in free-space well. The optical hybrid offers compact structure and good stability.

BRIEF DESCRIPTION OF THE DRAWINGS

The accompanying drawing, which are incorporated into and form a part of the disclosure, illustrate embodiment of the invention and, together with the description, serve to explain the principles of the invention.

DETAILED DESCRIPTION

The operating principle of the free-space optical hybrid of the present invention will be further described with reference to the drawings.

Figure 1:
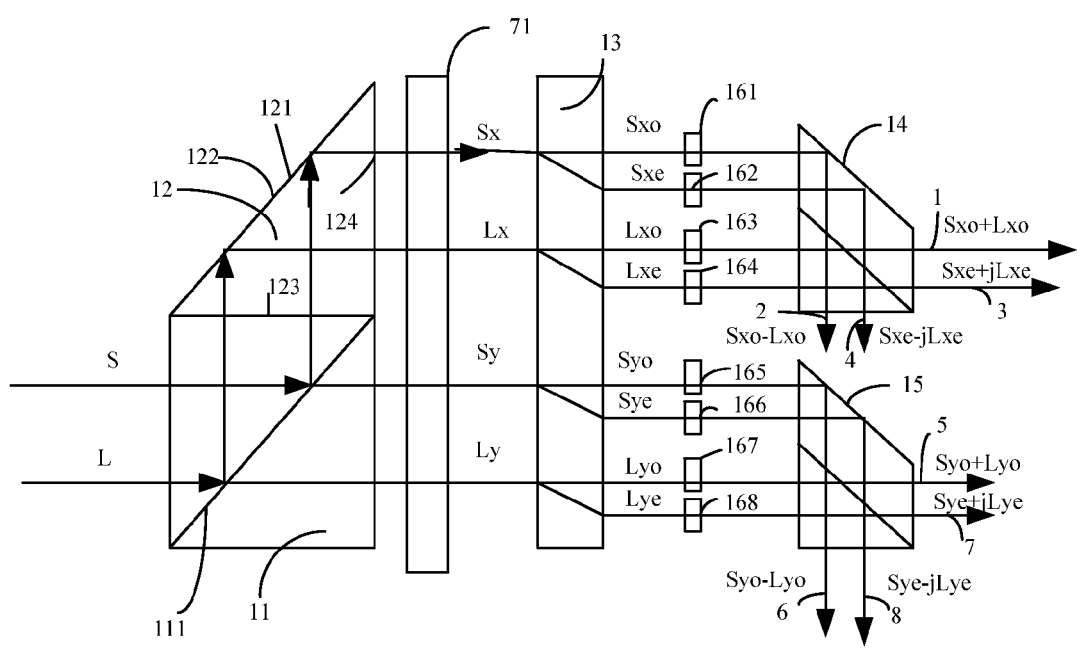
FIG. 1 illustrates the optical path of the free-space optical hybrid according to the first embodiment of the present invention.

As shown in FIG. 1, the present optical hybrid 10 includes a polarizing beam splitter 11. A beam S and a beam L are accident from left-hand side of the polarizing beam splitter 11 and hit beam splitter 11 at position A and position B. Both beams split into two parts a top component and a right component, the top optics is provided with a folding prism 12, the right optics is provided with a birefringent crystal 13, a first light-combiner 14 and a second light-combiner 15. The folding prism 12 includes a total-internal reflection oriented surface 121 and other surfaces 123 and 124 are coated with anti-reflective coating. The folding prism 12 is combined with the polarizing beam splitter 11.

A first phase shifter 161, a second phase shifter 162, a third phase shifter 163, a fourth phase shifter 164, a fifth phase shifter 165, a sixth phase shifter 166, a seventh phase shifter 167 and a eighth phase shifter 168 are provided on eight optical paths, which are between the birefringent crystal 13 and the first, second light-combiner 14, 15. The phase shifters are typically made by glass material. The shifters are provided to equalize the path lengths, by tuning the angle of the glass, in order to adjust the optical phase of the light beam.

A quarter-wave plate 71 is configured between the polarizing beam splitter 11 and the birefringent crystal 13 and transforms the line beam emitted from the polarizing beam splitter 11 into circular polarization light.

The birefringent crystal 13 can be a rutile, sapphire, yttrium orthovanadate (YVO4) crystal, MgF2 crystal, a-BaB2O4 crystal, lithium niobate and quartz crystal. A first and a second incident light beam S and L pass through the optical hybrid 10, and output a first interfering beam Sxo+Lxo, a second interfering beam Sxo−Lxo, a third interfering beam Sxe+jLxe, a fourth interfering beam Sxe−jLxe, a fifth interfering beam Syo+Lyo, a sixth interfering beam Syo−Lyo, a seventh interfering beam Sye+jLye and a eighth interfering beam Sye−jLye at a first port 1, a second port 2, a third port 3, a fourth port 4, a fifth port 5, a sixth port 6, a seventh port 7 and a eighth port 8 respectively. One half of the first incident light beam S is reflected by the beam splitting film 111 of the polarizing beam splitter 11 and forms a first horizontal polarization beam Sx. The other half of the first incident light beam S is transmitted by the beam splitting film 111 and forms a first orthogonal polarization beam Sy. A half of the second incident light beam L is reflected by the beam splitting film 111 of the polarizing beam splitter 11 and forms a second horizontal polarization beam Lx. The other half of the second incident light beam L is transmitted by the beam splitting film 111 and forms the second orthogonal polarization beam Ly. The first horizontal polarization beam Sx is split into two mutual perpendicular beams Sxo and Sxe by the birefringent crystal 13. The second horizontal polarization beam Lx is split into two mutual perpendicular beams Lxo and Lxe by the birefringent crystal 13. The first orthogonal polarization beam Sy is split into two mutual perpendicular beams Syo and Sye by the birefringent crystal 13. The second orthogonal polarization beam Ly is split into two mutual perpendicular beams Lyo and Lye by the birefringent crystal 13. The beam Sxo interferes with the beam Lxo by the first light combiner 14 and form a first interfering beam Sxo+Lxo and a second interfering beam Sxo−Lxo, and then output at the first port 1 and the second port 2. The beam Sxe interferes with the beam Lxe by the first light combiner 14 and forms a third interfering beam Sxe+jLxe and a fourth interfering beam Sxe−jLxe, and then output at the third port 3 and the fourth port 4. The beam Syo interferes with the beam Lyo by the second light combiner 15 and forms a fifth interfering beam Syo+Lyo and a sixth interfering beam Syo−Lyo, and then output at the fifth port 5 and the sixth port 6. The beam Sye interferes with the beam Lye by the second light combiner 15 and forms a seventh interfering beam Sye+jLye and a eighth interfering beam Sye−jLye, and then output at the seventh port 7 and the eighth port 8.

Thus, the beams Sxo+Lxo, Sxe+jLxe, Sxo−Lxo, Sxe−jLxe are the hybrided beams of beam S and beam L at X polarization status. The phase relations of the beam S and beam L of four beams are pi_0+0, pi_0+pi/2, pi_0+pi, pi_0+pi3/2. The beams Syo+Lyo, Sye+jLye, Syo−Lyo, Sye−jLye are the mixed beams of beam S and beam L at Y polarization status. The phase relations of the beam S and beam L of four beams are pi_0+0, pi_0+pi/2, pi_0+pi, pi_0+pi3/2.

Figure 2:
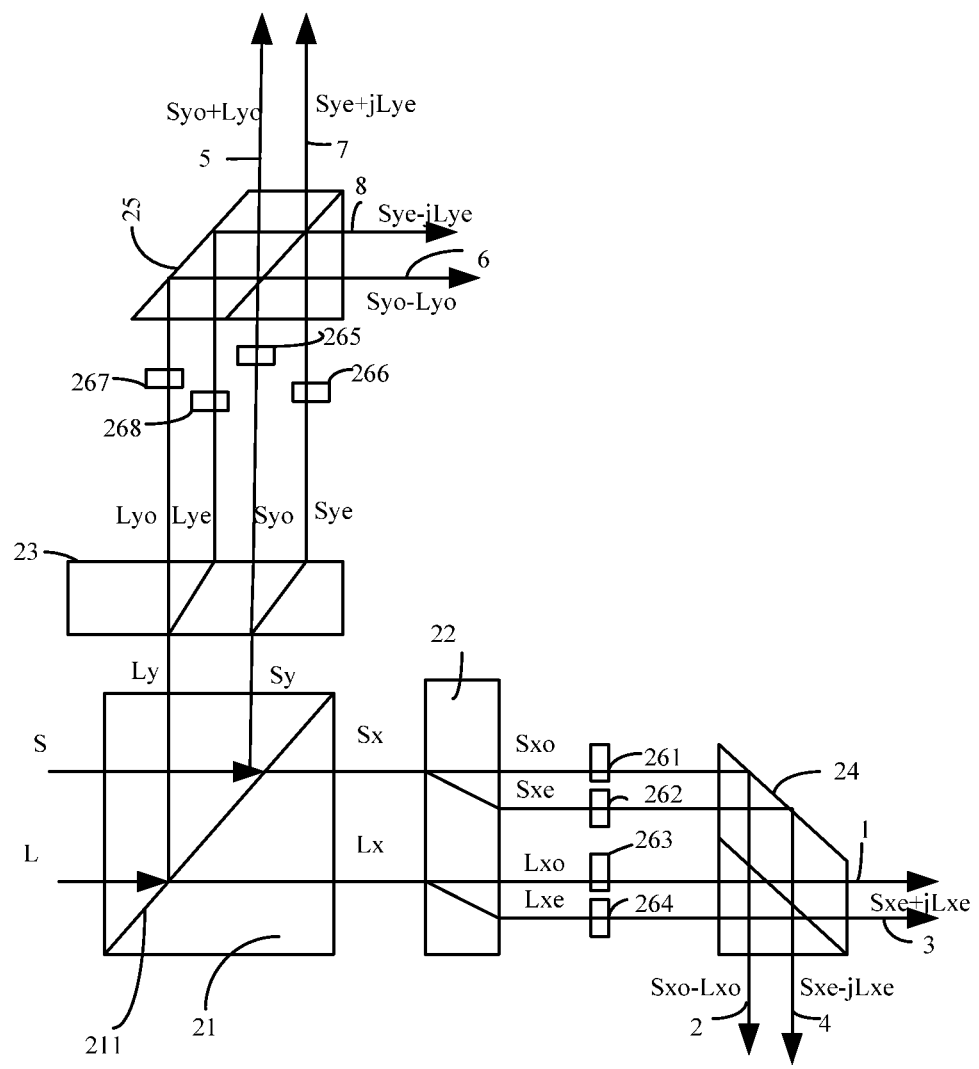
FIG. 2 illustrates the optical path the free-space optical hybrid according to the second embodiment of the present invention.

FIG. 2 illustrates the optical path of the second embodiment of the free-space optical hybrid. As shown in FIG. 2, the present optical hybrid 20 includes a polarizing beam splitter 21, a first birefringent crystal 22, a second birefringent crystal 23, a first light-combiner 24 and a second light-combiner 25. The bottom of the polarizing beam splitter 21 is configured with the first birefringent crystal 22 and the first light-combiner 24. The right side of the polarizing beam splitter 22 is configured with the second birefringent crystal 23 and the second light-combiner 25.

A first phase shifter 261, a second phase shifter 262, a third phase shifter 263, and a fourth phase shifter 264 are configured on the four optical paths, which are between the first birefringent crystal 22 and the first light-combiner 24. A fifth phase shifter 265, a sixth phase shifter 266, a seventh phase shifter 267, and a eighth phase shifter 268 are configured on the four optical paths, which are between the second birefringent crystal 23 and the second light-combiner 25. The phase shifters may consist of typical glass plates. The length of each optical path is adjusted by adjusting the incident angle of the glass plates and light beams.

The birefringent crystal 13 can be a rutile, sapphire, yttrium orthovanadate (YVO4) crystal, MgF2 crystal, a-BaB2O4 crystal, lithium niobate and quartz crystal.

A first and a second incident light beam S and L pass through the optical hybrid 20, and output a first interfering beam Sxo+Lxo, a second interfering beam Sxo−Lxo, a third interfering beam Sxe+jLxe, a fourth interfering beam Sxe−jLxe, a fifth interfering beam Syo+Lyo, a sixth interfering beam Syo−Lyo, a seventh interfering beam Sye+jLye and a eighth interfering beam Sye−jLye at a first port 1, a second port 2, a third port 3, a fourth port 4, a fifth port 5, a sixth port 6, a seventh port 7 and a eighth port 8 respectively. One half of the first incident light beam S is reflected by the beam splitting film 211 of the polarizing beam splitter 21 and forms a first horizontal polarization beam Sx. The other half of the first incident light beam S is transmitted by the beam splitting film 211 and forms a first orthogonal polarization beam Sy. A half of the second incident light beam L is reflected by the beam splitting film 211 of the polarizing beam splitter 21 and forms a second horizontal polarization beam Lx. The other half of the second incident light beam L is transmitted by the beam splitting film 211 and forms a second orthogonal polarization beam Ly. The first horizontal polarization beam Sx is split into two mutual perpendicular beams Sxo and Sxe by the first birefringent crystal 22. The second horizontal polarization beam Lx is split into two mutual perpendicular beams Lxo and Lxe by the first birefringent crystal 22. The first orthogonal polarization beam Sy is split into two mutual perpendicular beams Syo and Sye by the second birefringent crystal 23. The second orthogonal polarization beam Ly is split into two mutual perpendicular beams Lyo and Lye by the second birefringent crystal 23. The beam Sxo interferes with the beam Lxo by the first light combiner 24 and forms the first interfering beam Sxo+Lxo and the second interfering beam Sxo−Lxo, and then output at the first port 1 and the second port 2. The beam Sxe interferes with the beam Lxe by the first light combiner 24 and forms a third interfering beam Sxe+jLxe and a fourth interfering beam Sxe−jLxe, and then output at the third port 3 and the fourth port 4. The beam Syo interferes with the beam Lyo by the second light combiner 25 and forms a fifth interfering beam Syo+Lyo and a sixth interfering beam Syo−Lyo, and then output at the fifth port 5 and the sixth port 6. The beam Sye interferes with the beam Lye interfere by the second light combiner 25 and forms a seventh interfering beam Sye+jLye and a eighth interfering beam Sye−jLye, and then output at the seventh port 7 and the eighth port 8.

The beams Sxo+Lxo, Sxe+jLxe, Sxo−Lxo, Sxe−jLxe are the mixed beams of beam S and beam L at X polarization status. The phase relations of the beam S and beam L of the four beams are pi__0+0, pi__0+pi/2, pi__0+pi, pi__0+pi3/2. The beams Syo+Lyo, Sye+jLye, Syo−Lyo, Sye−jLye are the mixed beams of beam S and beam L at Y polarization status. The phase relations of the beam S and beam L of the four beams are pi__0+0, pi__0+pi/2, pi__0+pi, pi__0+pi3/2.

Figure 3:
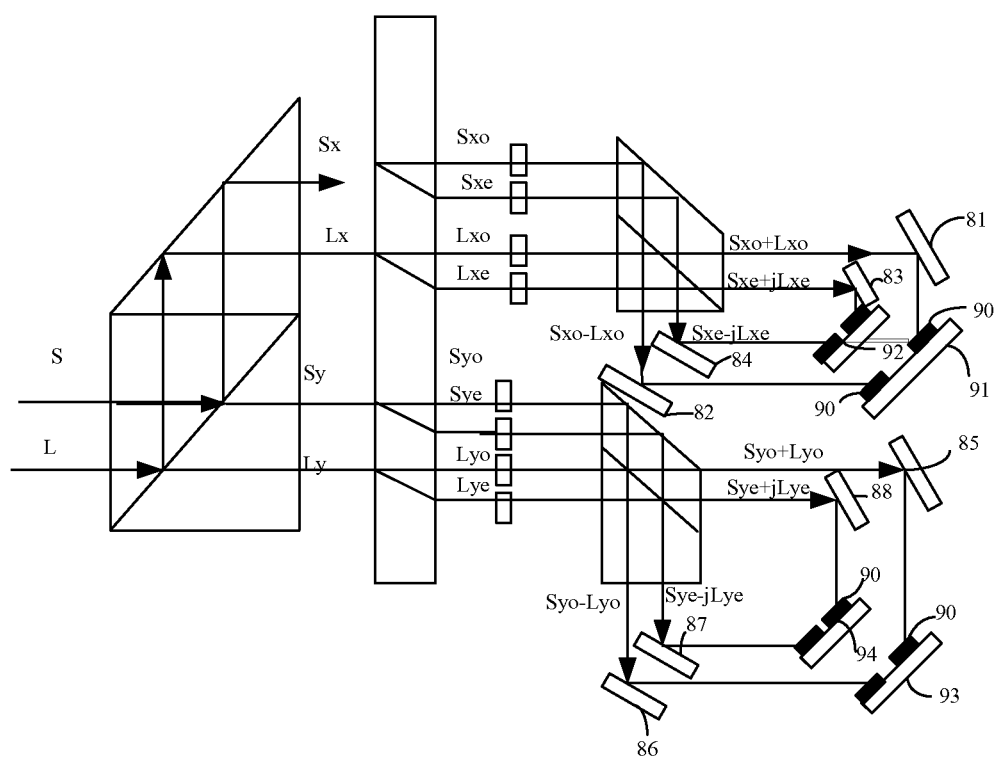
FIG. 3 illustrates the optical path of the free-space optical hybrid according to the third embodiment of the present invention.

FIG. 3 illustrates the free-space optical hybrid with the optical path of a photo detector (PD) according to the third embodiment of the present invention. As shown in FIG. 3, the beam Sxo+Lxo, the beam Sxe+jLxe, the beam Sxo−Lxo, the beam Sxe−jLxe, the beam Syo+Lyo, the beam Sye+jLye, the beam Syo−Lyo and the beam Sye−jLye output at the output port. The beam Sxo+Lxo and the beam Sxo−Lxo are reflected by reflectors 81 and 82 respectively, and then received and detected by the PD 90 on an optical monitor base plate 91. The beam Sxe+jLxe and the beam Sxe−jLxe output at output port. The beam Sxe+Lxe and the beam Sxe-Lxe are reflected by reflectors 83 and 84 respectively, and then received and detected by the PD 90 on an optical monitor base plate 92. The beam Syo+Lyo and the beam Syo−Lyo output at output port. The beam Syo+Lyo and the beam Syo−Lyo are reflected by reflectors 85 and 86 respectively, and then received and detected by the PD 90 on an optical monitor base plate 93. The beam Sye+jLye and the beam Sye−jLye output at output port. The beam Sye+Lye and the beam Sye-Lye are reflected by reflectors 88 and 87 respectively and then received and detected by the PD 90 on an optical monitor base plate 94.

The present invention can realize an optical hybrid in free-space by using a birefringent crystal and can split light beams of different polarization statuses in free-space well. The optical hybrid offers a compact structure and good stability.

The present invention has been described in terms of preferred embodiments. The described embodiments are not intended to restrict the scope of the present invention. It is recognized the equivalents, alternatives and modifications based on the present invention are within the scope of the appending claims.

What is claimed is:

1. A free-space optical hybrid comprising:
a polarizing beam splitter splitting the light beams S and L into horizontal polarization light beams Sx, Lx and orthogonal polarization light beams Sy, Ly respectively; and
at least one birefringent crystal splitting the horizontal polarization light beams Sx, Lx and orthogonal polarization light beams Sy, Ly into light beams Sxo, Sxe, Lxo, Lxe, Syo, Sye, Lyo, Lye;
a light combiner combining the light beams Sxo+Lxo, Sxo−Lxo, Sxe+jLxe, Sxe−jLxe, Syo+Lyo, Syo−Lyo, Sye+jLye, Sye−jLye and outputting the light beams at ports;
wherein the light beams Syo+Lyo, Sye+jLye, Syo−Lyo and Sye−jLye are the hybridized beams of beam S and beam L at X polarization status, and the phase relations of the beam S and beam L of four beams are pi__0+0, pi__0+pi/2, pi__0+pi, pi__0+pi3/2; the beams Syo+Lyo, Sye+jLye, Syo−Lyo, Sye−jLye are the hybridized beams of beam S and beam L at Y polarization status, and the phase relations of the beam S and beam L of four beams are pi__0+0, pi__0+pi/2, pi__0+pi, pi__0+pi3/2;

wherein the polarizing beam splitter is PBS or a birefringent crystal; a quarter-wave plate is configured between the polarizing beam splitter and the birefringent crystal, the quarter-wave plate transforms the light beam emitted from the polarizing beam splitter into circular polarization light;

the free-space optical hybrid further comprises a plurality of phase shifters configured between the birefringent crystal and the light combiner and for regulating the phase of each light; the phase shifters are glass plates or silicon plates;

the birefringent crystal is a rutile, sapphire, yttrium orthovanadate crystal, MgF2 crystal, a-BaB2O4 crystal, lithium niobate or quartz crystal;

wherein the at least one birefringent crystal comprising a first birefringent crystal for receiving the light beams Sx and Lx split by the beam splitter, and splitting the light beams Sx and Lx into the light beams Sxo, Sxe, Lxo and Lxe;

wherein the at least one birefringent crystal comprising a second birefringent crystal for receiving the light beams Sy and Ly split by the light-splitter, and splitting the light beams Sx and Lx into the light beams Syo, Sye, Lyo and Lye;

wherein a first light combiner is provided at the right side of birefringent crystal, the first light combiner combines the light beams Sxo, Sxe, Lxo and Lxe which transmit through the birefringent crystal into light beams Sxo+Lxo, Sxo−Lxo, Sxe+jLxe, Sxe−jLxe;

wherein a second light combiner is provided at the right side of birefringent crystal, the second light combiner combines the light beams Syo, Sye, Lyo and Lye which transmit through the birefringent crystal into light beams Syo+Lyo, Syo−Lyo, Sye+jLye, Sye−jLye;

wherein the light beams Sxo+Lxo, Sxe+jLxe, Sxo−Lxo, Sxe−jLxe, Syo+Lyo, Sye+jLye, Syo−Lyo, Sye−jLye converge on a corresponding photo detector via reflectors or lenses.

2. A free-space optical hybrid comprising:
a polarizing beam splitter splitting the light beams S and L into horizontal polarization light beams Sx, Lx and orthogonal polarization light beams Sy, Ly respectively; and
at least one birefringent crystal splitting the horizontal polarization light beams Sx, Lx and orthogonal polarization light beams Sy, Ly into light beams Sxo, Sxe, Lxo, Lxe, Syo, Sye, Lyo, Lye;
a light combiner combining the light beams Sxo+Lxo, Sxo−Lxo, Sxe+jLxe, Sxe−jLxe, Syo+Lyo, Syo−Lyo, Sye+jLye, Sye−jLye and outputting the light beams at ports;
wherein the light beams Syo+Lyo, Sye+jLye, Syo−Lyo and Sye−jLye are the hybridized beams of beam S and beam L at X polarization status, and the phase relations of the beam S and beam L of four beams are pi__0+0, pi__0+pi/2, pi__0+pi, pi__0+pi3/2; the beams Syo+Lyo, Sye+jLye, Syo−Lyo, Sye−jLye are the hybridized beams of beam S and beam L at Y polarization status, and the phase relations of the beam S and beam L of four beams are pi__0+0, pi__0+pi/2, pi__0+pi, pi__0+pi3/2;

wherein the polarizing beam splitter is PBS or a birefringent crystal; a quarter-wave plate is configured between the polarizing beam splitter and the birefringent crystal, the quarter-wave plate transforms the light beam emitted from the polarizing beam splitter into circular polarization light;

the free-space optical hybrid further comprises a plurality of phase shifters configured between the birefringent crystal and the light combiner and for regulating the phase of each light; the phase shifters are glass plates or silicon plates;

the birefringent crystal is a rutile, sapphire, yttrium orthovanadate crystal, MgF2 crystal, a-BaB2O4 crystal, lithium niobate or quartz crystal.

3. A free-space optical hybrid comprising:

a polarizing beam splitter splitting the light beams S and L into horizontal polarization light beams Sx, Lx and orthogonal polarization light beams Sy, Ly respectively; and at least one birefringent crystal splitting the horizontal polarization light beams Sx, Lx and orthogonal polarization light beams Sy, Ly into light beams Sxo, Sxe, Lxo, Lxe, Syo, Sye, Lyo, Lye;

a light combiner combining the light beams Sxo+Lxo, Sxo−Lxo, Sxe+jLxe, Sxe−jLxe, Syo+Lyo, Syo−Lyo, Sye+jLye, Sye−jLye and outputting the light beams at ports;

wherein the light beams Syo+Lyo, Sye+jLye, Syo−Lyo and Sye−jLye are the hybridized beams of beam S and beam L at X polarization status, and the phase relations of the beam S and beam L of four beams are pi__0+0, pi__0+pi/2, pi__0+pi, pi__0+pi3/2; the beams Syo+Lyo, Sye+jLye, Syo−Lyo, Sye−jLye are the hybridized beams of beam S and beam L at Y polarization status, and the phase relations of the beam S and beam L of four beams are pi__0+0, pi__0+pi/2, pi__0+pi, pi__0+pi3/2.

4. The free-space optical hybrid of claim 3, wherein the polarizing beam splitter is PBS or a birefringent crystal.

5. The free-space optical hybrid of claim 3, wherein a quarter-wave plate is configured between the polarizing beam splitter and the birefringent crystal, the quarter-wave plate transforms the light beam emitted from the polarizing beam splitter into circular polarization light.

6. The free-space optical hybrid of claim 3, further comprising a plurality of phase shifters configured between the birefringent crystal and the light combiner and for regulating the phase of each light.

7. The free-space optical hybrid of claim 6, wherein the phase shifters are glass plates or silicon plates.

8. The free-space optical hybrid of claim 3, wherein the at least one birefringent crystal comprising a first birefringent crystal for receiving the light beams Sx and Lx split by the beam splitter, and splitting the light beams Sx and Lx into the light beams Sxo, Sxe, Lxo and Lxe.

9. The free-space optical hybrid of claim 3, wherein the at least one birefringent crystal comprising a second birefringent crystal for receiving the light beams Sy and Ly split by the light-splitter, and splitting the light beams Sx and Lx into the light beams Syo, Sye, Lyo and Lye.

10. The free-space optical hybrid of claim 3, wherein a first light combiner is provided at the right side of birefringent crystal, the first light combiner combines the light beams Sxo, Sxe, Lxo and Lxe which transmit through the birefringent crystal into light beams Sxo+Lxo, Sxo−Lxo, Sxe+jLxe, Sxe−jLxe.

11. The free-space optical hybrid of claim 10, wherein a second light combiner is provided at the right side of birefringent crystal, the second light combiner combines the light beams Syo, Sye, Lyo and Lye which transmit through the birefringent crystal into light beams Syo+Lyo, Syo−Lyo, Sye+jLye, Sye−jLye.

12. The free-space optical hybrid of claim 11, wherein the light beams Sxo+Lxo, Sxe+jLxe, Sxo−Lxo, Sxe−jLxe, Syo+Lyo, Sye+jLye, Syo−Lyo, Sye−jLye converge on a corresponding photo detector via reflectors or lenses.

13. The free-space optical hybrid of claim 1, wherein the birefringent crystal is a rutile, sapphire, yttrium orthovanadate crystal, MgF2 crystal, a-BaB2O4 crystal, lithium niobate or quartz crystal.

\* \* \* \* \*